United States Patent [19]

Stava

[11] Patent Number: 5,117,088
[45] Date of Patent: May 26, 1992

[54] DEVICE AND METHOD FOR STARTING ELECTRIC ARC OF A WELDER

[75] Inventor: Elliott K. Stava, Brecksville, Ohio

[73] Assignee: The Lincoln Electric Company, Cleveland, Ohio

[21] Appl. No.: 668,790

[22] Filed: Mar. 13, 1991

[51] Int. Cl.⁵ ............................................. B23K 9/067
[52] U.S. Cl. ............................ 219/137 PS; 219/130.4
[58] Field of Search ............. 219/130.1, 130.4, 137 PS

[56] References Cited

U.S. PATENT DOCUMENTS

| | | | |
|---|---|---|---|
| 3,586,817 | 6/1971 | Manz | 219/130.4 |
| 3,617,689 | 11/1971 | Manz | 219/130.1 |
| 3,876,855 | 4/1975 | Hirasawa et al. | 219/130.4 |
| 4,417,129 | 11/1983 | Young | 219/130.4 |
| 4,767,912 | 8/1988 | Eldridge | 219/130.4 |

FOREIGN PATENT DOCUMENTS 63-5877  1/1988  Japan ........................... 219/130.4

*Primary Examiner*—Clifford C. Shaw
*Attorney, Agent, or Firm*—Body, Vickers & Daniels

[57] ABSTRACT

A method and apparatus for starting the electric arc of a welder by applying a high frequency, high voltage starting signal across the spark gap between the electrode and workpiece of the welder. This device and method comprises a series resonant circuit having a capacitive reactance element and an inductive reactance element combining to establish a resonant frequency for the series circuit, electrical drive means for energizing the series circuit at a driving frequency near a harmonic of the resonant frequency and means for converting the voltage developed across at least a portion of a designated one of the elements, generally the inductive reactance, into the starting signal.

50 Claims, 7 Drawing Sheets

DEVICE AND METHOD FOR STARTING ELECTRIC ARC OF A WELDER

DISCLOSURE

The present invention relates to the art of electric arc welding, primarily of the TIG welding type, and more particularly to a device and method for starting, striking and/or restriking the electric arc of such a welder.

The invention is particularly applicable for striking and restriking the electric arc of a TIG welder operated in the A.C. mode such as when welding aluminum and it will be described with reference thereto; however, it has broader application and may be used as a device and method of starting the electric arc in an arc welding installation in both the D.C and A.C. mode to apply a high frequency high voltage between the electrode and the workpiece for establishing the arc plasmas without contact of the electrode to the workpiece.

INCORPORATION BY REFERENCE

It is somewhat standard practice to apply a high voltage signal in the arc gap between the electrode and workpiece at zero crossings of the welding current so that the arc plasma will be started or restarted each time the welding current passes through the zero current condition. As general background for devices employed to start and restart the arc U.S. Pat. No. 3,876,855. U.S. Pat. No. 4,417,129 shows a D.C. welder with a high voltage signal device to start the arc between the electrode and the workpiece. These prior patents are incorporated by reference herein as disclosure of the general status of the prior art to which the present invention is directed.

BACKGROUND OF INVENTION

In alternating current arc welding installations, such as TIG welding operated in the A.C mode, the welding current alternates between positive and negative polarity; therefore, during each half cycle the welding current is zero at the zero crossing. At this instant, the arc between the electrode and workpiece tends to be unsustainable. Various techniques are employed for preventing erratic welding operation due to periodic extinguishing of the welding arc. In some power supplies, the current is instantaneously shifted between the polarities to provide insufficient time for the arc to be extinguished. However, a more common procedure is to provide high frequency, high voltage signals across the arc gap just after the zero crossing points of the welding current to strike and restrike the arc at the appropriate time. The present invention is directed toward a device and method of accomplishing this function. The most common arrangement for striking and restriking the welding arc is illustrated in U.S. Pat. No. 3,876,855, especially FIG. 1 and FIG. 3a. In the illustrated TIG welding process the arc is struck or restruck between the base metal, or workpiece, and the tungsten electrode with no physical contact by applying a high voltage, high frequency signal at an appropriate time during the welding cycle. The high frequency, high voltage generator used in the past, and illustrated in the above mentioned patent produces a high voltage, high frequency by a spark gap oscillating high frequency generator wherein a power supply is attached to a high frequency generating circuit through a transformer having a capacitor and inductance and a spark gap wherein the inductor and capacitor control the oscillation of the high frequency circuit. An inductor in this circuit is coupled between the input line of the power supply to the welding station by a coupling transformer to superimpose the spark created, high frequency signal on the welding current. The high frequency, high voltage created by the prior art spark gap device includes frequency components ranging over a wide band with the center frequency being in the range of 1.0-1.5 MHz. Consequently, there is substantial radiant energy interference generated by the arc starting device. Since the spark gap generators provide a large spectrum of transmitted signals, the energy across the arc gap of the welding installation is not well defined and substantial energy is applied at substantially lower frequencies than the base transmitted frequency of the spark generator. In addition stray higher frequencies can cause interference with associated logic within the welder itself and adjacent electronically controlled machinery and equipment. This is a real problem with use of standard TIG welders in factories where other digital control machinery exists. The spectrum of transmitted signals by the spark gap generator is controlled by the spark gap phenomenon and not by other parameters of the high frequency portion of the generator. A representative illustration of this basic concept employed for TIG welders is found in FIG. 3 of U.S. Pat. No. 3,876,855. This patent then discloses a circuit, as illustrated in FIG. 1 of the present application, to provide a kick voltage superimposed upon the welding current for the purpose of striking and restriking the arc plasma of a TIG welder when operated in an A.C. mode. This kick voltage will also function to start the arc in a D.C. mode of operation. In this type of prior art system, capacitor C is charged by a D.C. power supply E. In an appropriate instant, switch SW discharges capacitor C through the primary of coupling transformer T. This produces a kick voltage in the input line between terminals PS of the power supply and W of the electrode. The kick voltage concept of prior art, as illustrated schematically in FIG. 1 of the present application, produces a single pulse near the zero crossing of the welding current for a TIG welder. This starting arrangement has substantial disadvantages. A single high voltage pulse may not adequately start, strike or restrike the arc. Since there is no frequency involved, except for normal frequency distribution of the single pulse, the welding electrode must be protected against inadvertent contact with the operator at the time of the high voltage pulse. Further, the power supply E limits the output voltage of the single pulse for starting the plasma arc. Switch SW is a limiting factor of the magnitude of the output kick voltage. The voltage level is determined by the rate of discharge of the capacitor as well as the magnitude of the power supply E. To overcome some disadvantages of the prior art illustrated in FIG. 1 of the present application, U.S. Pat. No. 4,417,129 employs the prior art device illustrated in FIG. 2 of this application. In this device capacitor C is charged by a number of pulses through a FET switch periodically operated by pulses at transformer T1 under the control of programmed control circuit PC. After the capacitor C is charged, transformer T2 applies grid signal to vacuum tube VT for discharging the capacitor through coupling transformer T3. The capacitor C is charged incrementally to a value dependent upon the number of pulses to a primary of transformer T1. A pulse is fed to the primary of transformer T2, which pulse drives the high current capacity vacuum tube VT into conduction. When tube VT is fired, a high current pulse is fed through capacitor C1 to the primary of step up transformer T3. The pulse in the output of transformer T3 is in the range of 8-25 Kvolts dependent upon the number of pulses through switch FET. The pulse will have a minute width of about 1.0 ms by using a vacuum tube VT. Thus, a short, high voltage spike or kick voltage is created across the electrode and workpiece of the TIG welder at or near the zero crossing. This concept uses a single pulse, as in the prior art device illustrated in FIG. 1.

FIG. 3, which is not prior art, contains explanatory information and is presented for use in this background portion. If the kick voltage concepts of the prior art were modified to produce a series of pulses P1 at the zero crossing ZX of the welding current, pulses applied to the coupling transformer of a starting circuit would have a spacing defined by the commutation and resetting parameters of the kick voltage system. Thus, several pulses P1 could be created at the zero crossings to assure starting, striking and/or restriking of the plasma arc. However, the reset time of the circuit S would make the high voltage pulses P2 relatively widely spaced to produce high voltage at a relatively low frequency. This concept would not be advantageous for use in a standard TIG welder.

A single pulse kick voltage as disclosed in U.S. Pat. No. 3,876,855 is best employed in D.C. welding. In A.C. TIG welding a high frequency, high voltage signal, such as shown in FIG. 3a of this prior patent is normally employed for striking and restriking the arc.

THE PRESENT INVENTION

The present invention relates to a device and method for starting the electric arc of a welder by applying a high frequency, high voltage starting signal across the arc gap between the electrode and workpiece of the welder in a controlled manner to produce a high frequency, high voltage repetitive signal which can be applied at a selected portion of the welding cycle such as at the zero crossings of the welding current in an A.C. welder the frequency can be above 60-100 KHz and can be concentrated with the vast majority of the energy contained in a selected frequency signal. In this manner, high voltage, high frequency can be applied across the arc gap in a repetitive number of pulses without the disadvantage of the spark gap generator creating an interference spectrum and the kick voltage concept using a single pulse at the appropriate time in the welding cycle. Thus, the starting signal has a frequency which is high enough that the high voltage signal has a low reference depth and, thus, travels along the surface of any object in its conductive path. Consequently, the present invention overcomes all of the disadvantages of prior art devices and methods for starting, striking and/or restriking the plasma arc of an electric arc welder.

In accordance with the present invention, there is provided a device for starting the electric arc of a welder by applying a high frequency, high voltage starting signal across the arc gap between the electrode and workpiece of the welder. The term "starting" means starting, striking and/or restriking as these terms are employed in the welding art. Generally starting is used in D.C. welding and striking and restriking is the concept used in A.C. operation. A device constructed in accordance with the present invention comprises a resonant circuit, preferably a series circuit, having a capacitive reactance element and an inductive reactance element combining to establish a resonant frequency of the series circuit and an electrical driving means for energizing the series circuit at a driving frequency near a harmonic of the resonant frequency. The term "harmonic" is used herein to mean frequencies which are related to the first harmonic by a factor of the reciprocal of an integer, such as 1/1, $\frac{1}{2}$, $\frac{1}{3}$, $\frac{1}{4}$, ... 1/n. Except for the first harmonic these are sometimes referred to as subharmonics. Preferably the driving frequency is near the resonant or first harmonic; however, it can be near a subharmonic. The first harmonic or resonant frequency is preferred. In practice, the first subharmonic has been used. It is realized that the second harmonic can not be used effectively because as the harmonic driving frequency is shifted away from the first harmonic, less energy and efficiency is realized. It is intended to define the invention in a manner using the first harmonic and other harmonics close thereto. The preferred embodiment has a resonant frequency of about 200 KHz. Preferably it is driven by a signal with a frequency within 10% of 200 KHz. However, a frequency of 100 KHz (first subharmonic) can perform satisfactorily. The second subharmonic, 66.6 KHz can also be used, but with less efficiency. This discussion is to show the basis for using the term "harmonic" to define the invention when preferably the resonant frequency (i.e. the first harmonic) is used in practice.

It is intended that the driving frequency is a harmonic of resonant frequency of the series resonant circuit and preferably the resonant frequency or first harmonic; however, this driving frequency can vary a certain percentage above or below the actual harmonic frequency of the series circuit. In practice, the driving frequency is in the neighborhood of ±5% and it may be applicable to a driving frequency, ±10% of the actual resonant frequency or harmonic frequency when the resonant frequency or first harmonic is not used. As the driving frequency varies from the resonant frequency, the magnitude of the output power of the device is decreased according to a distribution curve generally shown in FIG. 13. Further in accordance with the invention, there is means for converting the voltage developed across at least one portion of a designated one of the elements into the starting signal. In accordance with the present invention, the inductive reactance element of the new device is the element that creates the output voltage. This element is a primary winding and its leakage reactance of the coupling transformer used in arc starting circuits. Consequently, in accordance with the normal operating concept of the present invention, the inductive reactance element of the inventive device is the primary of an output coupling transformer. This transformer is a normal step up transformer having a ratio of at least approximately 1-5 and preferably 1-20, so that a given voltage in the inductive reactance will be multiplied by the ratio to create a higher voltage across the arc gap of the welding installation.

In accordance with another aspect of the present invention, the high frequency established by the drive frequency of the series resonant circuit is in excess of 60-100 KHz and preferably in the general range of 150-250 KHz. In practice, a high frequency output signal is in the general range of 200 KHz.

In accordance with still a further aspect of the present invention, in an A.C. welder, the driving means is selectively actuated so that it commences operation at or near the zero crossing of the welding current and continues for a preselected time to create a series of high frequency, high voltage signals or pulses across the arc gap of the welder in much the same way as the prior high spectrum spark gap generator. The difference being that the frequency of the present invention is selected and fixed. There is no random magnetic transmissions nor is there any energy being created in the arc gap at a frequency substantially different than the resonant frequency of the device. As the frequency changes from the resonant frequency, or a subharmonic thereof, the transmitted energy drastically decreases in accordance with the illustration in FIG. 13 of this application showing peak voltage at the output of the present invention at the resonant frequency of 200 KHz and at the subharmonic frequency of 100 KHz. The time during which the driving signal is actuated will determine the number of pulses used to assure that the arc plasma is started, struck or restruck by a high frequency, high voltage signal which has a low reference depth as a safety factor. The subharmonic (100 KHz) shown at the left of FIG. 13 has essentially the same peak voltage but a duty cycle of one half the resonant frequency signal. This gives a low power at the arc gap.

In accordance with another aspect of the invention, the pulsating or driving signal for energizing the series resonant circuit is a sinusoidal energizing signal. In accordance with the preferred embodiment of the invention, the input or energizing signal of the driving means includes means for applying a series of D.C. pulses to the resonant series circuit at a rate to create an input frequency to the series circuit which is a harmonic of the resonant frequency of the series circuit. In accordance with this aspect of the invention, the input of the series resonant circuit is grounded between the D.C. pulses to create the input driving signal at or near the desired driving frequency of the series resonant circuit.

In accordance with another aspect of the present invention there is provided a method of starting the electric arc of a welder by applying a high frequency, high voltage starting signal across the arc gap between the electrode and workpiece, which method comprises the step of providing a series resonant circuit having a capacitive reactance element and an inductive reactance element combining to establish a resonant frequency circuit; energizing the series circuit at a driving frequency near a subharmonic or the resonant frequency, first harmonic, of the series resonant circuit; and, converting the voltage developed across at least a portion of a designated one of the elements, preferably the inductive reactance, into the starting signal for the welder.

The primary object of the present invention is the provision of a device and method for starting, striking and/or restriking the arc of an electric arc welder, which device and method create a high voltage at a selected high frequency which is directed to the arc gap of a welder to heat the surfaces, cause ionization and to otherwise establish and reestablish the welding arc plasma in an arc welder, such as a TIG welder operated in the D.C. and/or A.C. mode.

In accordance with another object of the present invention there is provided a device and method, as defined above, which device and method has a frequency sufficiently high to prevent injury or discomfort by a welder accidentally contacting the electrode during the starting operating mode.

Still a further object of the present invention is the provision of a device and method, as defined above, which device and method has a high output frequency, which frequency is well defined as a harmonic of a resonant circuit, preferably a series circuit, in the device and/or method, which frequency reduces random signals to minimize the magnetic radiation during operation of the device and/or method.

Yet another object of the present invention is the provision of a device and method, which device and method has the advantages of the somewhat standard spark generator, without the disadvantage of random transmissions and undue noise and without the disadvantages of the prior devices that produce a kick voltage.

Another object of the present invention is the provision of a device and method, as defined above, which device and method employs the voltage created across the inductive element of a series resonant circuit driven at its resonant frequency, or alternatively a high order harmonic thereof, to drive the coupling transformer of an arc starting system for an electric arc welder, such as a TIG welder.

Still a further object of the present invention is the provision of a device and method, as defined above, which device and method eliminate random electromagnetic transmission from the arc starting device of an electric arc welder.

Another object of the present invention is the provision of a device and method, as defined above, which device and method operate at a resonant condition to thereby create a high voltage at a selected high frequency, such as 150–250 KHz to assure skin effect transmission of the arc starting signal and to provide a drastic reduction of transmitted energy as the frequency deviates from the resonant condition of the device.

Another object of the present invention is the provision of a device and method, as defined above, which device and method produces a substantial output for starting the arc of a welder at a selected resonant frequency, so that the input power to the starting device can be low such, as 200 volts peak, while the output voltage to the coupling transformer can be many times greater than the input peak voltage.

Still a further object of the present invention is the provision of a device and method, as defined above, which device and method can use a set of FET switches to drive the device, wherein the switches need to accommodate upwards of 20 amperes of driving current, but only a low input voltage, such as a voltage in the general range of 200 volts D.C. In this manner, the FET driving switches do not require expensive solid state units that can accommodate high voltages, such as 1,000 volts. If the switches were required to handle upwards of 1,000 volts, the current capacity of the FETS would be substantially less than about 1–3 amperes. Consequently, FETS rated for low voltage and high current can be employed in the present invention. These FETS are substantially less expensive than high voltage FETS. Thus, the present invention can employs semiconductors that have a high current rating instead of a high voltage rating. This feature of the invention substantially reduces the cost of switching components. By employing the present invention, low voltage switching devices can create the driving signal for energizing the series resonant circuit. In summary, in accordance with this object of the invention, the invention allows the use of low input voltage while the resonant frequency operation of the series resonant circuit produces high voltages on the capacitive reactance element and inductive reactance element. One of these elements is then used to produce the high coupling voltage for the starting device.

These and other objects and advantages will become apparent from the following description taken together with the various drawings defined in the next section.

PREFERRED EMBODIMENT

Figure 1:
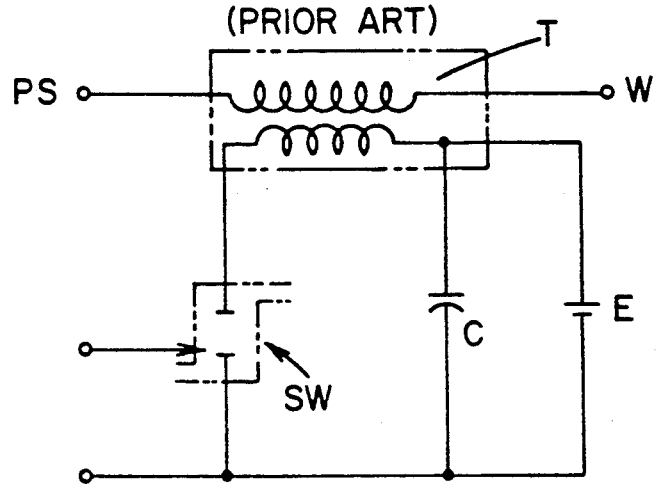
FIG. 1 is a wiring diagram of the prior art corresponding to FIG. 2 of U.S. Pat. No. 3,876,855.
Figure 2:
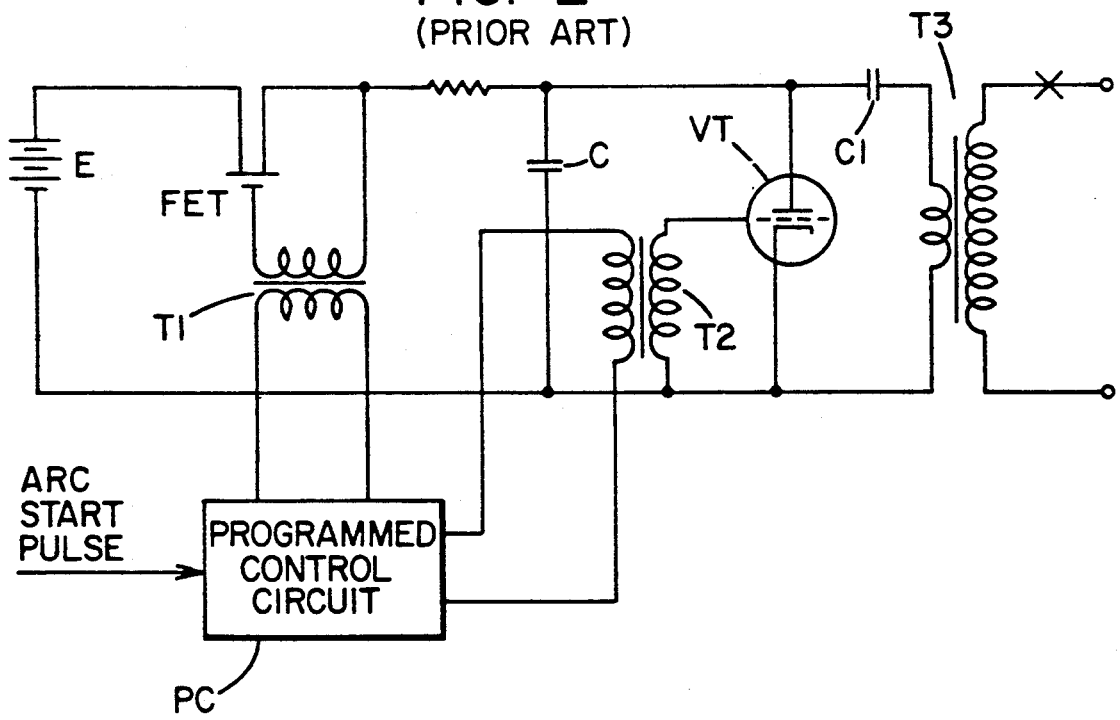
FIG. 2 is a wiring diagram of the prior art illustrated in FIG. 2 of U.S. Pat. No. 4,417,129.
Figure 3:
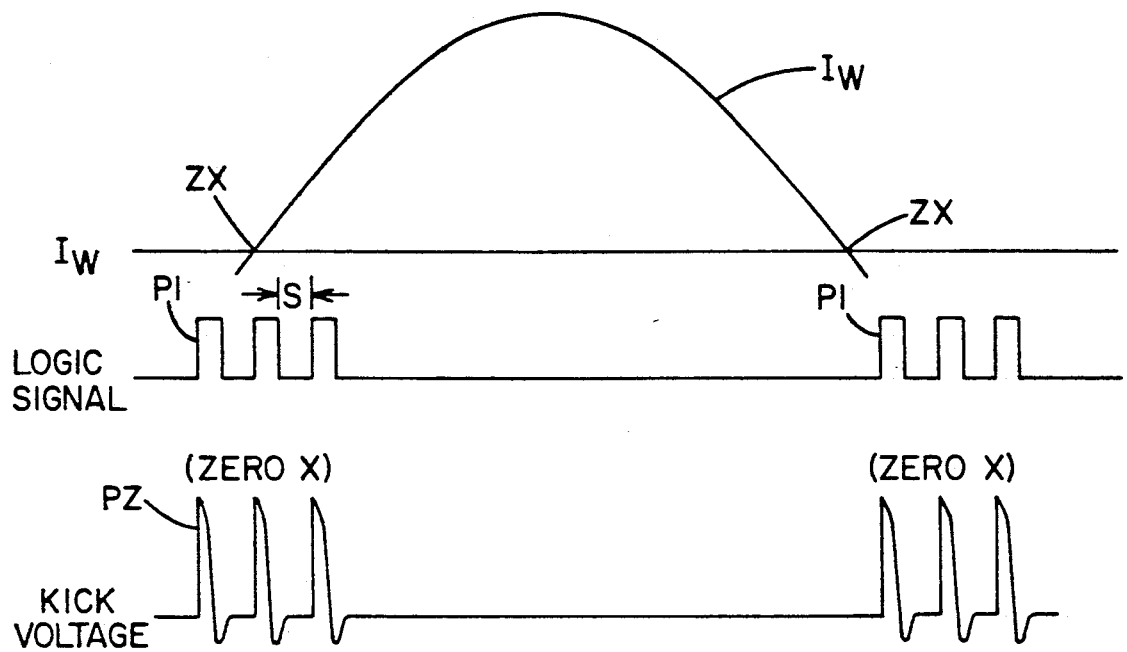
FIG. 3 is a pulse diagram illustrating operation of a kick voltage arc starter device but using several input pulses.
Figure 4:
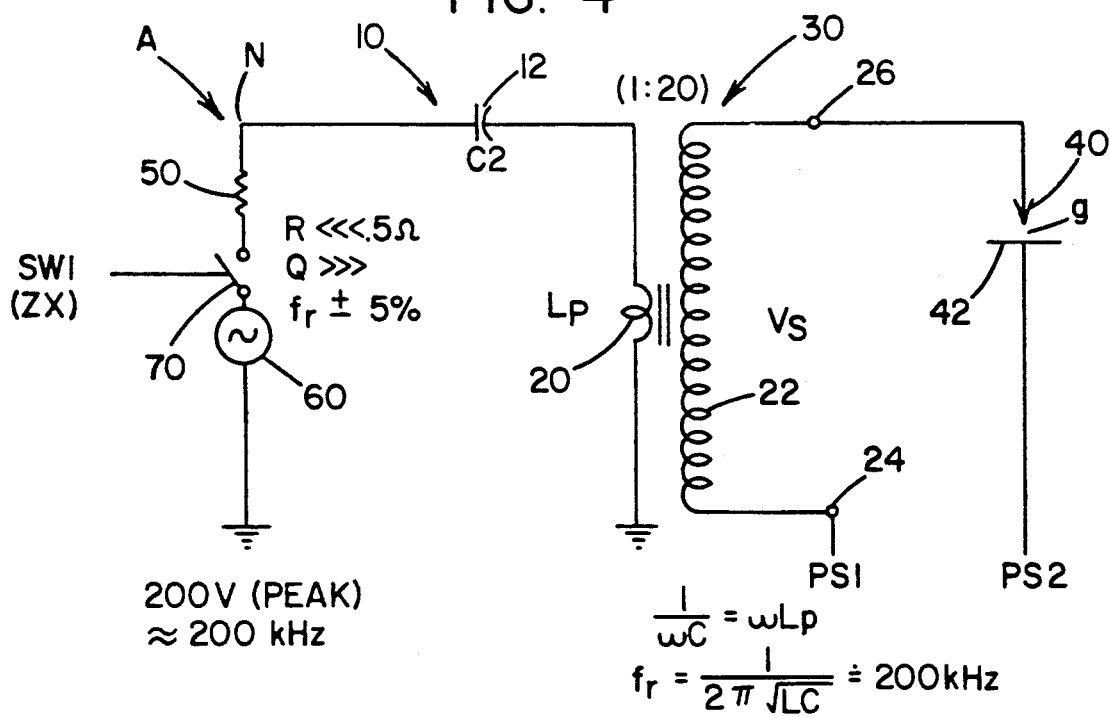
FIG. 4 is a wiring diagram illustrating the broad aspect of the present invention.
Figure 5:
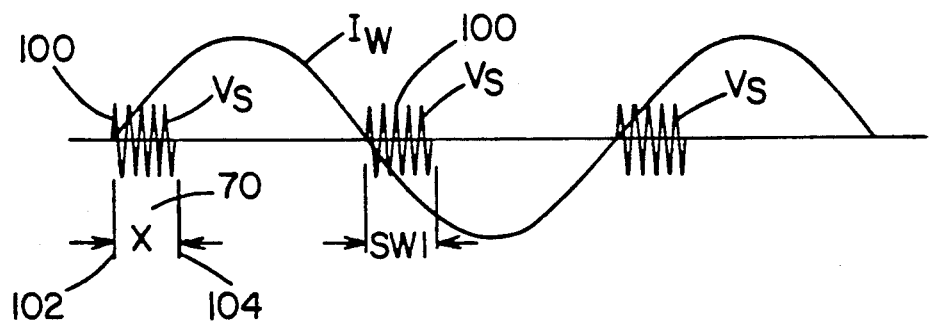
FIG. 5 is a pulse diagram superimposed upon a welding circuit illustrating use of the present invention.
Figure 6:
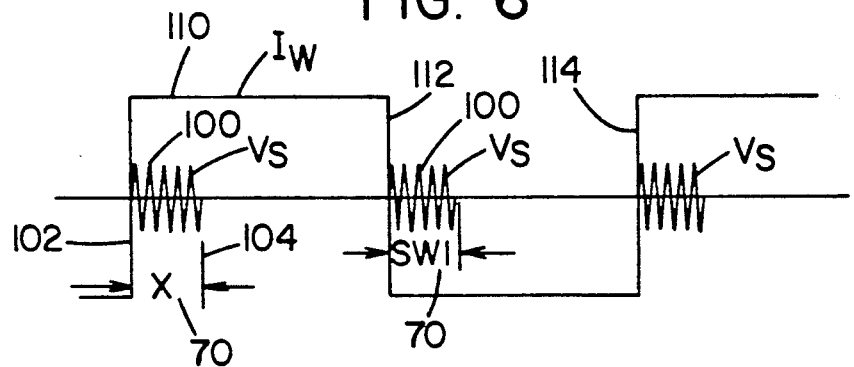
FIG. 6 is a pulse diagram similar to FIG. 5 employing the present invention in an A.C. welder having essentially instantaneous zero crossings.

Referring now to the drawings where the showings are for the purpose of illustrating the preferred embodiment of the invention only and not for the purpose of limiting same, FIG. 4 shows a starting device A constructed in accordance with the present invention for starting, striking and/or restriking an arc. Generally the term "starting" can be applied to a D.C. welder; however, this particular invention employs starting, striking and restriking for use in either a D.C. welder or, preferably, as illustrated in the preferred embodiment of the invention, an A.C. welder such as a TIG welder used in the reverse polarity mode of operation. Device A includes a series resonant circuit 10 formed from a capacitive reactance C2, shown as capacitor 12, and an inductive reactance $L_P$, shown as the primary winding 20 of a coupling transformer 30. The secondary winding of coupling transformer is secondary winding 22 across which the output voltage $V_S$ appears between terminals 24, 26. In accordance with somewhat standard practice, transformer 30 is a step up transformer having a step ratio of over 1-5 and preferably, as illustrated, a ratio of 1-20. Output winding 22 can be employed in various arrangements for applying the output high frequency, high voltage $V_S$ across electrode 40 and workpiece 42 of a TIG welding installation. The plasma arc is created and is to be sustained in arc gap g between the electrode element and the workpiece element as schematically illustrated in FIG. 4. In this schematic illustration, the output of the power supply is designated as PS1, PS2 and, in the illustrated embodiment, is an A.C. welding current $I_W$ as illustrated in FIGS. 3, 5 and 6 onto which is superimposed a high voltage, high frequency arc starting or striking voltage $V_S$. Various arrangements are employed for superimposing the starting voltage signal onto the A.C. welding current and FIG. 4 is only representative in nature. The arrangement for using the output starting voltage $V_S$ is not necessarily a part of the invention, except device A includes a circuit that directs a high voltage, high frequency controlled starting signal across gap g of the welding installation. Various electrical parameters and principles employed in the operation of device A as schematically illustrated in FIG. 4 are labeled on this figure for convenience.

Figure 13:
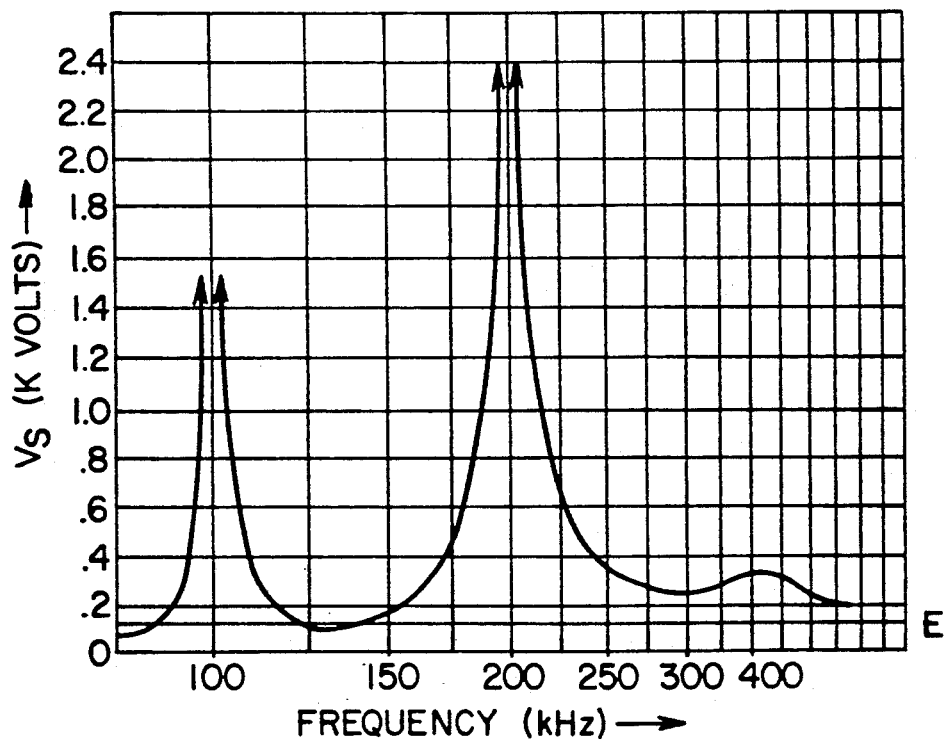
FIG. 13 is a graph illustrating schematically the voltage increase on the inductive reactance used as the primary winding of coupling transformer in the preferred embodiment of the present invention at various harmonics of the resonant frequency; and, FIG. 14 is a wiring diagram of the present circuit used to drive a series resonant circuit at the resonant frequency of the circuit.
Figure 14:
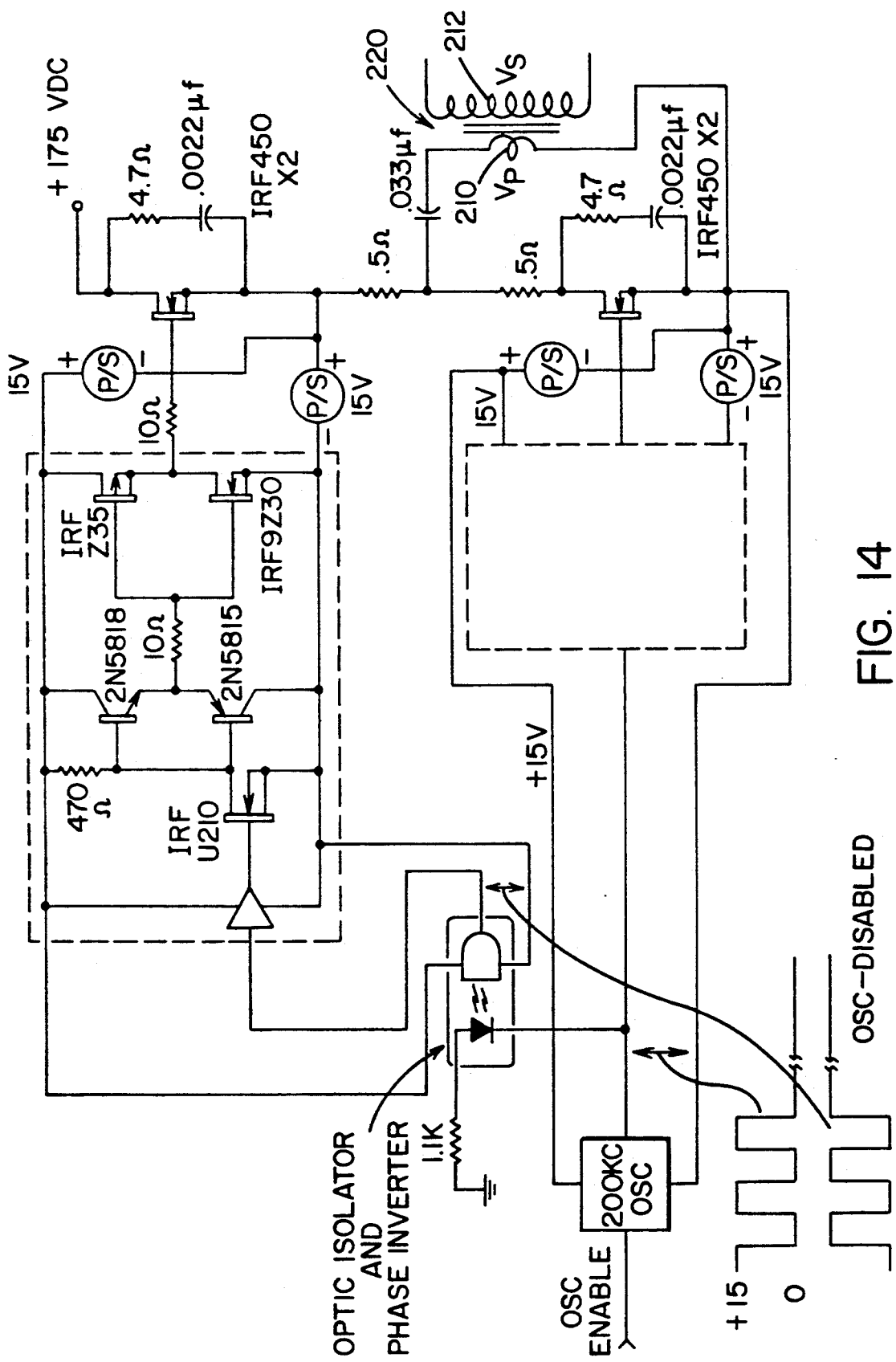

The series resonant circuit 10 including capacitor 12 and winding 20 is driven at point N through a small resistor 50 by way of an input drive signal generator or device 60, which is operated at the resonant frequency of circuit 10. In this illustrated embodiment, the signal from generator or device 60 has a peak voltage of 175-200 volts and a frequency of approximately 200 KHz. This is the resonant frequency determined by the capacitive reactance and inductive reactance of circuit 10. As explained above point N can be driven at those harmonics on both sides of the first harmonic or resonant frequency of circuit 10. This concept is shown in FIG. 13. These harmonics drive the circuit at resonance. The preferred drive frequency is at the resonant frequency of circuit 10. Resistor 50 is illustrated as 0.5 ohms to give a high quality factor Q for the resonant circuit. To apply the resonant frequency driving signal to circuit 10 there is provided a switch SW1 which closes at the zero crossing ZX of the welding current $I_W$. The switch is maintained closed for a preselected time to create the necessary number of pulses at the resonant frequency across gap g. Thus, at or near zero crossing, switch SW1 is closed for a preselected time to activate device A for producing an output voltage $V_S$ between terminals 24, 26. By driving series resonant circuit 10 at resonant frequency $f_r$, the peak voltage of generator or signal device 60 is only a small fraction of the voltage across winding 20 of transformer 30. This high voltage, which is drastically increased over the voltage of input signal 60, is further increased by step up transformer 30 to produce several Kvolts across gap g at the frequency of series circuit 10. Thus, only at the resonant frequency, illustrated as 200 KHz, or a close subharmonic, i.e. $\frac{1}{2}$, $\frac{1}{3}$, is there any power directed across the gap. This frequency is high enough to prevent any injury by inadvertent contact with electrode 40. At lower frequencies (between 200-100 KHz) there is no power being created across gap g. The only transmitted signal is the 200 KHz, high voltage input signal across gap g. It is possible for circuit 10 to include more inductive reactance than winding 20. For that reason, it is stated that a power of voltage created across the inductive reactance need be used in the output of device A. In practice, the inductive reactance is formed by only the input winding 20 of transformer 30. By using a resonant circuit, high voltage is also created across capacitor 12. This could be used to create a kick voltage output with a separate switching network; however, that is not the anticipated use of the present invention. The anticipated use of the present invention is the application of the high voltage, high frequency signal that is created across secondary winding 20 as the input of a step up transformer to create a high voltage, high frequency signal across gap g when switch 70 is closed. The switch is operated normally at the zero crossing. This feature requires a standard zero crossing detector. However, other arrangements could be used for opening and closing switch SW1 (70) to control the time during which an envelope of high frequency, high voltage starting signals are created across gap g.

In FIG. 5, the welding currents $I_W$ is a sine wave having periodic zero crossings. The starting signal pulse envelope 100 created by device A, shown in FIG. 4, commences at 102, when switch SW1 or 70 is closed. This pulse envelope is discontinued at 104 when the switch 70 is opened. Thus, a detector indicates the zero crossing and envelope 100 is impressed upon the welding current to produce the high frequency, high voltage output signal $V_S$ across gap g. This envelope is synchronized with welding current $I_W$. When the A.C. power supply produces a current reversing welding current $I_W$ as shown in FIG. 6, the zero crossings occur quite rapidly and can be detected by the normal control circuit of the power supply. In the square wave A.C. welding current $I_W$ of FIG. 6 the welding current has an upper level 110, trailing edge 112 and leading edge 114. Pulse envelope 100 is created at the reversal of polarity at edges 112, 114. Again, switch 70 is closed at 102 and opened at 104 to create a preselected number of pulses in envelope 100 at the zero crossing of welding current $I_W$.

Figure 7:
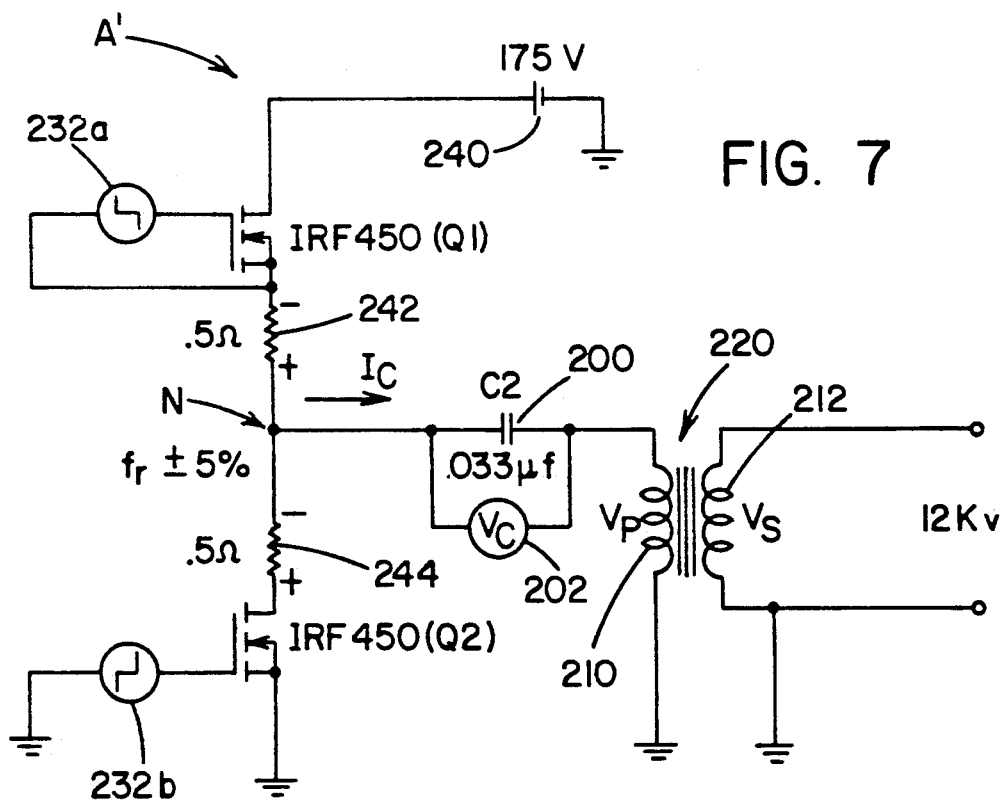
FIG. 7 is a wiring diagram of the preferred embodiment of the present invention.

The preferred embodiment of the invention as now implemented is illustrated in FIG. 7, wherein capacitor 200 which is bridged by voltage meter 202, is placed in series with primary winding 210 to form a series resonant circuit as previously described. Primary winding 210 is the input of coupling transformer 220 having an output winding 212 across which is developed the high frequency, high voltage output of preferred embodiment device A'. The series resonant circuit including capacitor 200 and primary 210 as the active elements, is connected to an input or drive point N, which point is driven by a pulsating input drive signal operating at the resonant frequency $f_r$ of the series resonant circuit. In device A of FIG. 4, point N was driven by a sinusoidal wave. In the preferred embodiment of the invention, device A' is driven by a D.C. voltage power supply 240 having a 175 volts D.C. output. To operate the resonant frequency input at point N, a FET switch Q1 is closed for a preselected time x which is the width of envelope 100. This switch Q1 is then opened and FET switch Q2 is closed for a preselected time, again time x. Both of these switches Q1, Q2 are FET switches that are synchronized by input control 232a, 232b. These controls forward bias the two switches at different times and at a rate to give the desired frequency at point N. Thus, when one switch is on, the other switch is off. These switches are switched between off and on at the resonant frequency of the series circuit so that the series circuit is driven through point N at its resonant frequency. The particular switching sequence can be controlled by any number of control circuits driven by a crystal controlled oscillator, which oscillator is adjusted to control the frequency of the pulsating signal applied to the series resonant circuit at point N. The drive circuit now used is shown in the wiring diagram of FIG. 13 which is disclosed as the present switching circuit.

Figure 8:
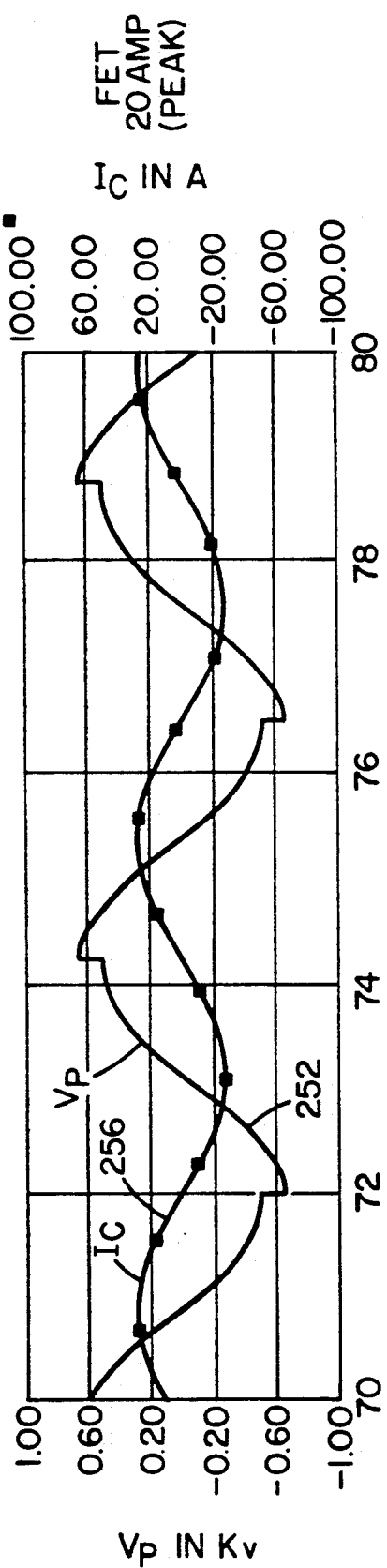
FIGS. 8 and 9 are graphs illustrating the operating characteristics of the preferred embodiment of the invention as illustrated in FIG. 7.
Figure 9:
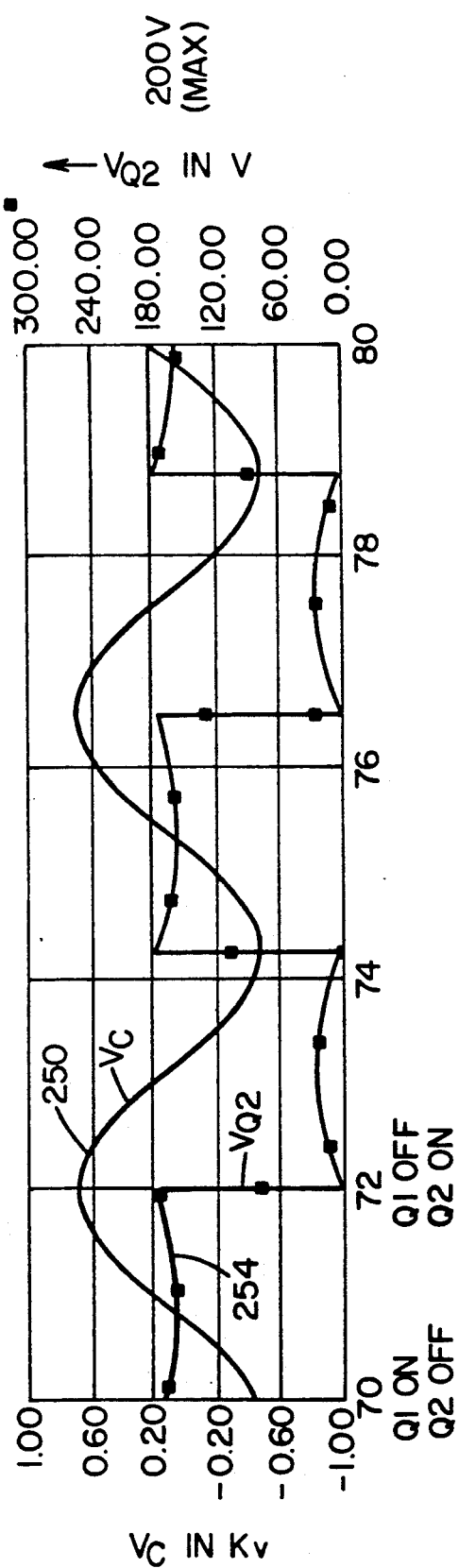

FIGS. 8 and 9 are the wave forms at various locations of device A' as shown in FIG. 7. Curve 250 is the voltage $V_C$ across capacitor 200. Curve 252 is the voltage $V_P$ across winding 210. As can be seen, these two voltage curves are generally opposite and somewhat equal as is the situation when a resonant circuit is driven at a resonant frequency, i.e. at one of the harmonics. With a 175 volt D.C. input, the voltage across winding 210 varies from +600 volts to −600 volts. Thus, the circuit has an increase in several times the input voltage, while the individual FETS forming switches Q1, Q2 are exposed to a low voltage, i.e. 200 volts. Graph 254 is the voltage applied across switch Q2. This voltage varies from approximately 0 volts to less than 200 volts D.C. during operation of device A'. Consequently, the charging current $I_C$, shown as graph 256 in FIG. 8, can vary between ±20 amperes while using a relatively inexpensive solid state switching units. These graphs indicate that substantial voltage is created at secondary 212 with relatively minor voltage impact applied to the switches Q1, Q2.

Figure 10:
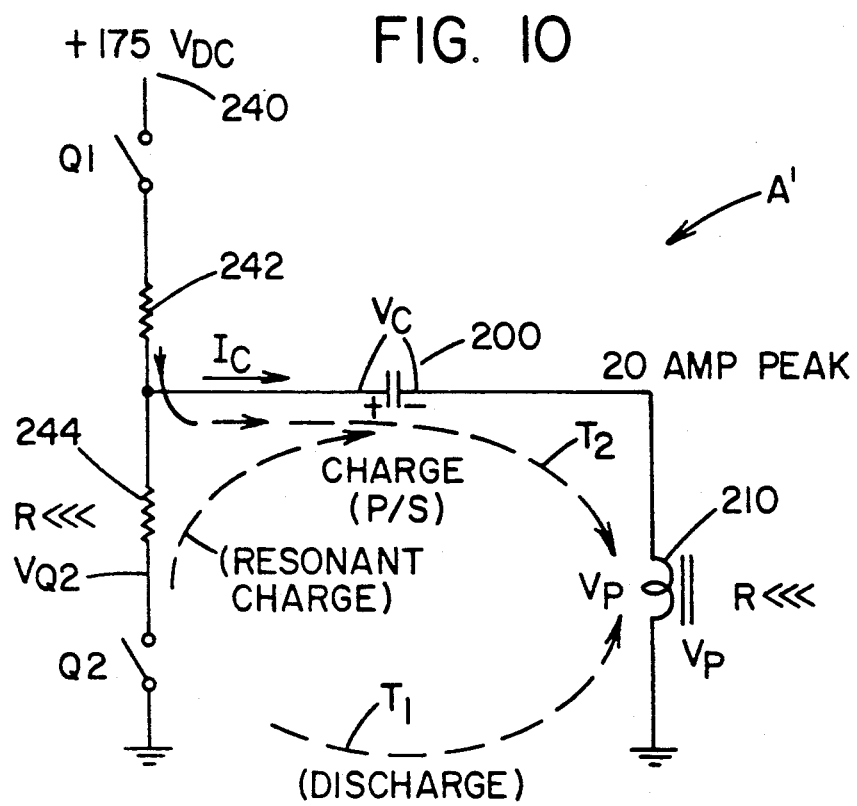
FIG. 10 is a schematic wiring diagram of the preferred embodiment of the present invention shown in FIG. 7 and illustrating certain operating characteristics of the preferred embodiment of the present invention.
Figure 11:
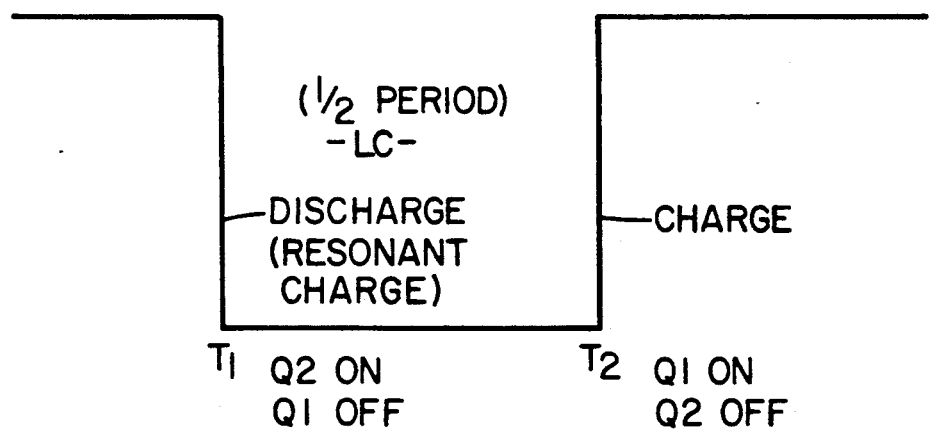
FIG. 11 is a pulse diagram showing the input pulses to the preferred embodiment of the present invention, as illustrated in FIG. 7 and schematically illustrated in FIG. 10.

The preferred embodiment of the invention as illustrated in FIG. 7 employs a positive pulse of D.C. current and then the point N is grounded by closing switch Q2. This basic arrangement is illustrated schematically in FIG. 11 and explained by the schematic representations of FIG. 10. Current limiting resistors 242, 244 have extremely small values. In practice all of these resistors are less than about 0.5 Ohms. As illustrated in FIG. 10, when switch Q1 is closed, 200 volts D.C. is applied across the series resonant circuit formed by capacitor 200 and winding 210. When this occurs, capacitor 200 is charged as indicated by the solid line charging path $T_2$. After one-half cycle switch Q1 is opened. Thus, the circuit has not yet started oscillation at resonant frequency. When Q1 is opened, switch Q2 is closed. This now connects winding 210 to capacitor 200 so that the capacitor can be discharged along the dashed line $T_1$. There is a resonant charging of capacitor 200 so that the capacitor continues to increase in voltage beyond the original 175 volts available from power supply 240. Since this is a resonant circuit, as the voltage across capacitor 200 increases beyond the 200 volts, the voltage across winding 210 also drastically increases. Voltages $V_C$ and $V_P$ are opposite and equal. Consequently, by driving the series resonant circuit at its resonant frequency, substantial voltages are developed across capacitor 200 and across the winding 210. Voltage $V_P$ is multiplied by the coupling transformer and applied across gap g, as shown in FIG. 4. The charging and discharging schematically illustrated in FIG. 10 is set forth in FIG. 11 wherein at time $T_1$ when switch Q2 is closed and switch Q1 is opened, capacitor 200 is discharged. The capacitor is also being charged by resonant action. At the time $T_2$ switch Q1 is closed and switch Q2 is opened. This causes further charging of capacitor. By the alternate charging and discharging of capacitor through application of a positive 200 volts at point N and then grounding point N, the series circuit is driven at its resonant frequency. The spacing between $T_1$, $T_2$ is one-half of the period of the natural frequency which is determined by the value of the capacitive reactance of capacitor 200 and the inductive reactance of winding 210.

Figure 12:
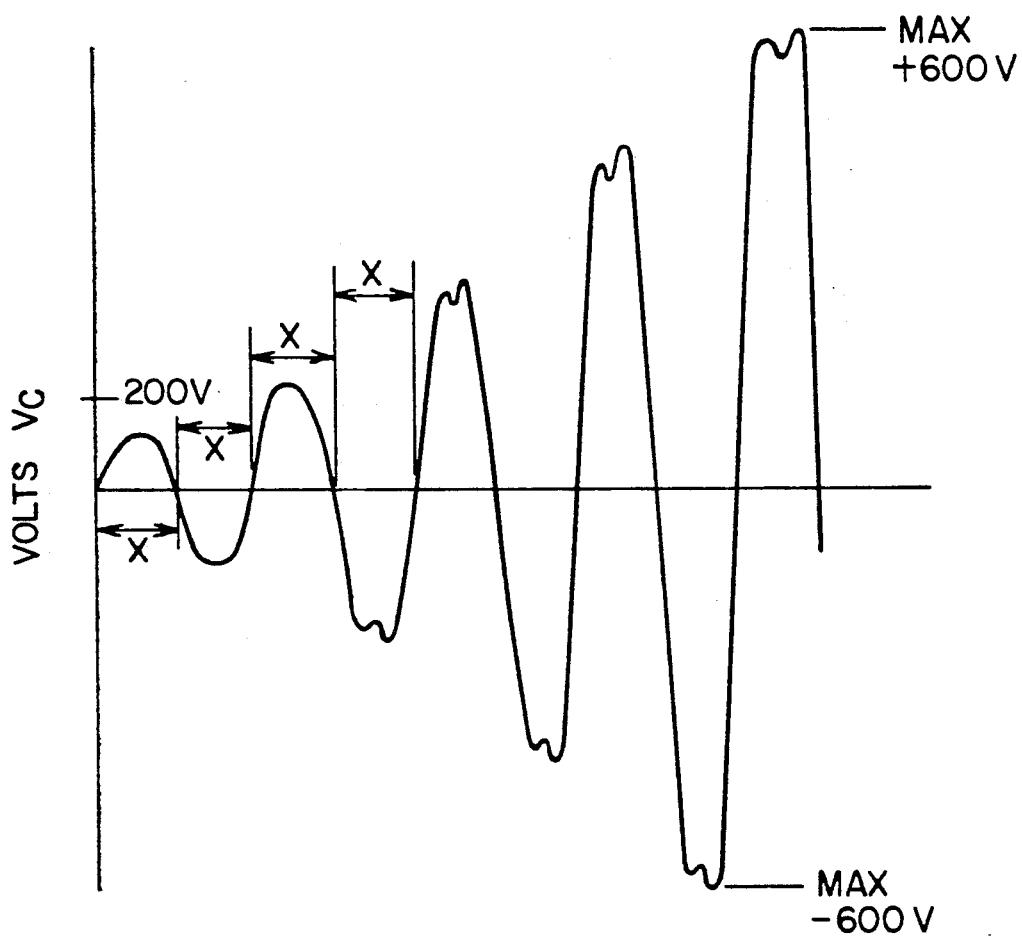
FIG. 12 is a charging diagram for the capacitor of the series resonant circuit employed in the preferred embodiment of the present invention.

FIG. 12 relates to the initial operation of device A' shown in FIG. 7 and schematically illustrated in the diagram of FIG. 10. As the 175 volt signal is applied to points N, the voltage across the capacitor oscillates at the applied frequency as shown in FIG. 12 and the magnitude of voltage $V_C$ continues to increase. Eventually, the magnitude of the oscillating voltage $V_C$ reaches a maximum voltage level, which in FIG. 9 is ±600 volts. An equal and opposite voltage is created at winding 210. A 1-20 step up transformer would increase this 600 volt, high frequency signal to approximately 12 Kvolts. Consequently, the output of device A' is substantially over 10.0 Kilovolts at a frequency of approximately 200 KHz. This is a substantial improvement over existing starting and/or arc striking devices for use in welding equipment, such as TIG welders.

As previously discussed, FIG. 13 shows that at resonant frequencies of approximately 100 KHz and 200 KHz voltage across output $V_S$ is substantially increased over the 175 volt input. At the second harmonic, there is a low power increase that is not used; thus, "harmonic" means the first harmonic and the close subharmonic. It is conceivable that a resonant circuit could be devised which would use the higher harmonic; then those harmonics would be equivalent. The most efficient resonant condition is the actual resonant frequency of the series circuit, i.e. 200 KHz. The device will operate at least for the first subharmonic 100 KHz and probably at the second subharmonic 66.6 KHz. Below that level the reference depth is becoming high enough to produce a physical reaction when contacting the electrode. At the second harmonic, the input switching becomes drastically less efficient. Thus, in the preferred embodiment, harmonics $f_1$, $f_{\frac{1}{2}}$, and $f_{\frac{1}{3}}$ are used. The first harmonic, i.e. the resonant frequency $f_1$ is by far the most preferred resonant condition.

In prior devices, the only manner of increasing the voltage was step up transformers. The present invention relates to the concept of employing a resonant circuit wherein the voltage across the winding is drastically increased over the input voltage necessary to excite the arc striking or starting circuit at the resonant frequency. This is done in practice by a series resonant circuit.

In practice the voltage $V_P$ has been reduced to about 400 volts in one example of the present invention. Consequently, output voltage $V_S$ is approximately 8.0 Kvolts. This adjustment was to obtain an output voltage in the general range of 5.0-10.0 Kvolts, which is sufficient for arc ionization.

Having thus defined the invention, the following is claimed:

1. A device for starting the electric arc of a welder including an arc gap between an electrode and a workpiece, said device comprising a series resonant circuit including an inductor, a portion of which is a transformer primary winding, and a capacitor, said series circuit having a given resonant frequency; electrical means for driving said series circuit with an electrical signal pulsating at a driving frequency near only one of the harmonics of said resonant frequency; a transformer with a secondary winding and means for coupling said secondary winding to said primary winding; and, means for applying the voltage developed across said secondary winding across said arc gap.

2. A device as defined in claim 1 including means for selectively actuating said electrical driving means.

3. A device as defined in claim 2 including means for detecting when the welding current across said arc gap crosses zero and said selective actuating means includes means for activating said electrical signal in response to the detection of a zero crossing.

4. A device as defined in claim 3 including means for deactivating said electrical signal a given time after said signal is activated.

5. A device as defined in claim 3 wherein said transformer is a step up transformer.

6. A device as defined in claim 5 wherein the step up ratio of said transformer is at least 1:5.

7. A device as defined in claim 2 wherein said transformer is a step up transformer.

8. A device as defined in claim 7 wherein the step up ratio of said transformer is at least 1:5.

9. A device as defined in claim 2 wherein said driving frequency is within 10% of said resonant frequency.

10. A device as defined in claim 1 wherein said transformer is a step up transformer.

11. A device as defined in claim 10 wherein the step up ratio of said transformer is at least 1:5.

12. A device as defined in claim 10 wherein said driving frequency is within 10% of said resonant frequency.

13. A device as defined in claim 1 wherein said inductor is said transformer primary winding.

14. A device as defined in claim 13 wherein said driving frequency is within 10% of said resonant frequency.

15. A device as defined in claim 1 wherein said pulsating electrical signal is a sinusoidal electrical signal.

16. A device as defined in claim 1 wherein said drive means includes means for applying a D.C. voltage to said series circuit and then grounding said series circuit at a sequence rated near said harmonic of the resonant frequency.

17. A device as defined in claim 16 wherein said driving frequency is within 10% of said resonant frequency.

18. A device as defined in claim 1 wherein said driving frequency is within 10% of said resonant frequency.

19. A device for starting the electric arc of a welder by applying a high frequency, high voltage starting signal across the arc gap between an electrode and the workpiece, said device comprising a series resonant circuit having a capacitive reactance element and inductive reactance element combining to establish a resonant frequency for said series circuit; electrical driving means for energizing said series circuit at a driving frequency near only one the harmonics of said resonant frequency; and, means for converting the voltage developed across at least a portion of a designated one of said elements into said starting signal.

20. A device as defined in claim 19 wherein said designated element is said inductive reactance element.

21. A device as defined in claim 20 wherein said converting means is a transformer and said portion of said inductive reactance element is the primary winding of said transformer.

22. A device as defined in claim 21 wherein said transformer is a step up transformer.

23. A device as defined in claim 22 wherein the step up ratio of said transformer is at least 1:5.

24. A device as defined in claim 19 wherein said high frequency is a frequency above about 60 KHz.

25. A device as defined in claim 19 wherein said high frequency is in the general range of 150-250 KHz.

26. A device as defined in claim 19 including means for selectively actuating said electrical driving means.

27. A device as defined in claim 26 including means for detecting when the welding current across said arc gap crosses zero and said selective actuating means includes means for activating said electrical signal in response to the detection of a zero crossing.

28. A device as defined in claim 27 including means for deactivating said electrical signal a given time after said signal is activated.

29. A device as defined in claim 19 wherein said electrical driving means includes means for applying a generally sinusoidal energizing signal to said series circuit.

30. A device as defined in claim 19 wherein said electrical driving means includes means for applying a series of D.C. pulses to said series circuit.

31. A device as defined in claim 30 wherein said electrical driving means further includes means for grounding said series circuit between said D.C. pulses.

32. A device as defined in claim 19 wherein said driving frequency is within about 10% of said resonant frequency.

33. A device as defined in claim 19 wherein said driving frequency is within about 5% of said resonant frequency.

34. A method of starting the electric arc of a welder including an arc gap between an electrode and a workpiece, said method comprising the steps of:
  (a) providing a series resonant circuit including an inductor, a portion of which is a transformer primary winding, and a capacitor, said series circuit having a given resonant frequency;
  (b) driving said series circuit with an electrical signal pulsating at a driving frequency near only one of the harmonics of said resonant frequency;
  (c) providing a transformer with a secondary winding;
  (d) coupling said secondary winding to said primary winding; and,
  (e) applying the voltage developed across said secondary winding across said arc gap.

35. A method of starting the electric arc of a welder by applying a high frequency, high voltage starting signal across the arc gap between an electrode and the workpiece, said method comprising the steps of:
  (a) providing a series resonant circuit having a capacitive reactance element and inductive reactance element combining to establish a resonant frequency for said series circuit;
  (b) energizing said series circuit at a driving frequency near only said resonant frequency; and,
  (c) converting the voltage developed across at least a portion of a designated one of said elements into said starting signal.

36. A method as defined in claim 35 wherein said designated element is said inductive reactance element.

37. A method as defined in claim 36 including the additional steps of:
  (d) performing said converting step by a transformer and with said portion of said inductive reactance element being the primary winding of said transformer.

38. A method as defined in claim 37 wherein said converting step transformer is a step up transformer.

39. A method as defined in claim 35 wherein said high frequency is a frequency above about 60 KHz.

40. A method as defined in claim 35 wherein said high frequency is in the general range of 150–250 KHz.

41. A method as defined in claim 35 including the additional step of:
  (d) selectively actuating said electrical driving means.

42. A method as defined in claim 41 including the additional steps of:
  (e) detecting when the welding current across said arc gap crosses zero; and,
  (f) activating said electrical signal in response to the detection of a zero crossing.

43. A method as defined in claim 42 including the additional steps of:
  (g) deactivating said electrical signal a given time after said signal is activated.

44. A method as defined in claim 35 wherein said energizing step includes the step of:
  (d) applying a generally sinusoidal energizing signal to said series circuit.

45. A method as defined in claim 35 wherein said energizing step includes the step of:
  (d) applying a series of D.C. pulses to said series circuit.

46. A method as defined in claim 45 wherein said energizing step further includes the step of:
  (e) grounding said series circuit between said D.C. pulses.

47. A method as defined in claim 35 wherein said driving frequency is written about 10% of said resonant frequency.

48. A method as defined in claim 35 wherein said driving frequency is written about 5% of said resonant frequency.

49. A device for starting the electric arc of a welder by applying a high frequency, high voltage starting signal across the arc gap between an electrode and the workpiece, said device comprising a resonant circuit having a capacitive reactance element and an inductive reactance element combining to establish a resonant frequency for said resonant circuit; electrical driving means for energizing said resonant circuit at a driving frequency near only said resonant frequency; and, means for converting the voltage developed across at least a portion of a designated one of said elements into said starting signal.

50. A device as defined in claim 49 wherein said resonant circuit is a series resonant circuit.

* * * * *